April 1, 1941.　　O. F. CARLSON　　2,237,174
FLOAT VALVE
Filed July 8, 1940　　2 Sheets-Sheet 1
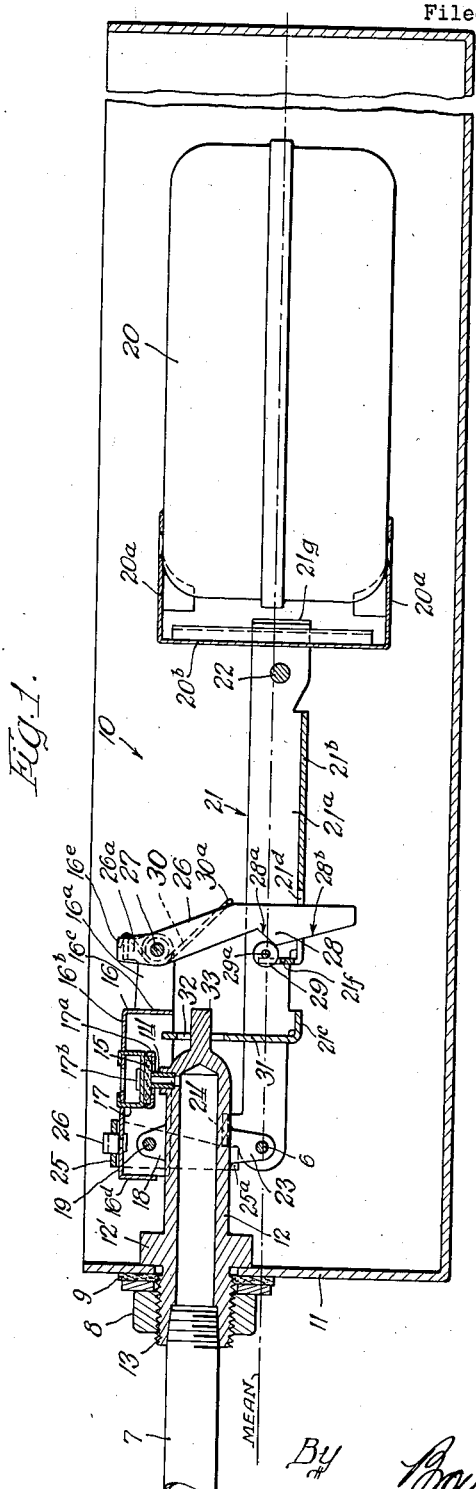
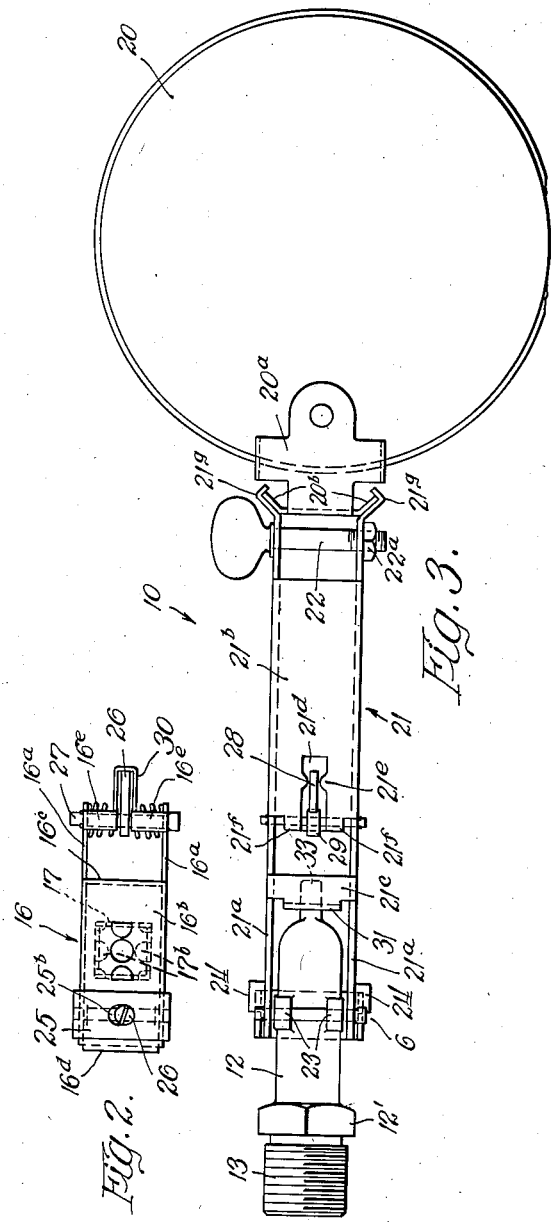
Inventor:
Oscar F. Carlson.

April 1, 1941.  O. F. CARLSON  2,237,174
FLOAT VALVE
Filed July 8, 1940  2 Sheets-Sheet 2
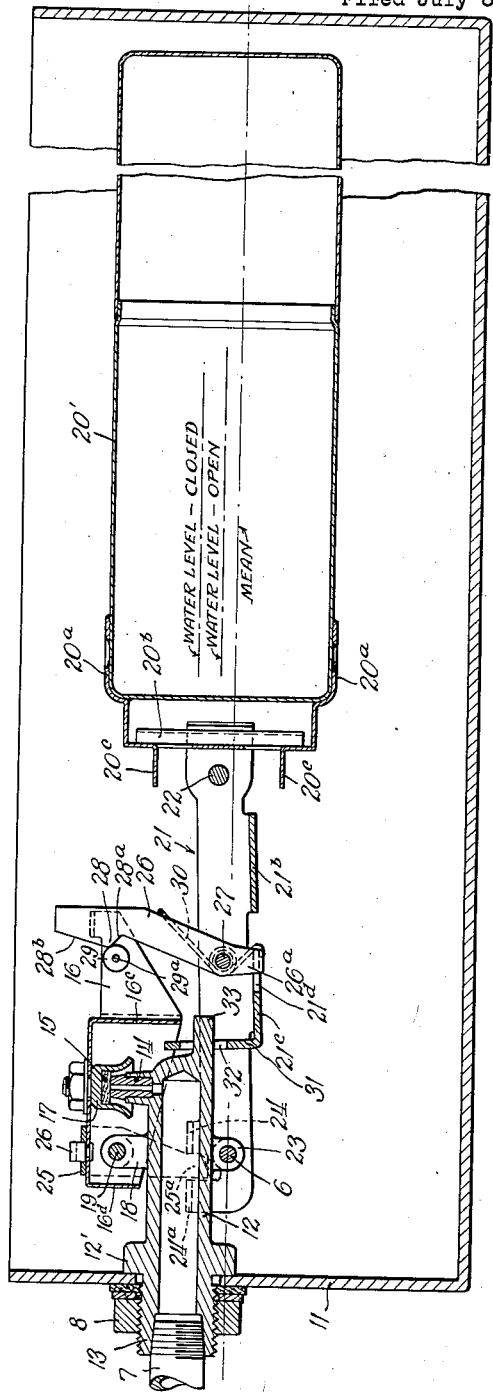
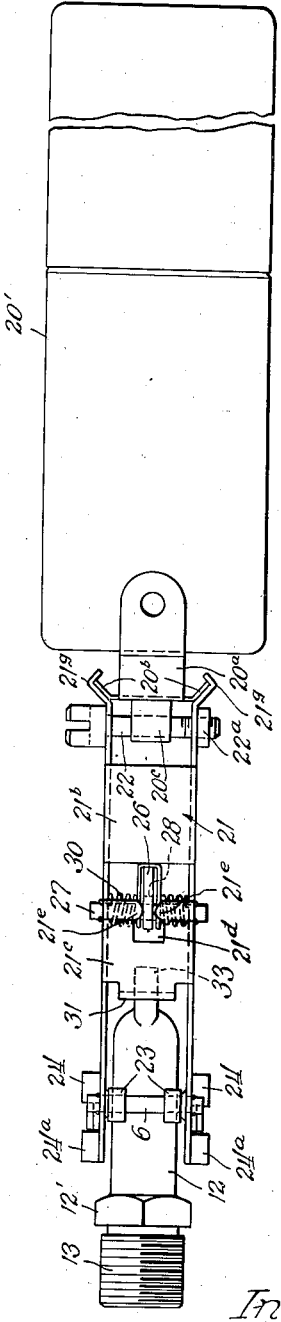
Inventor:
Oscar F. Carlson Patented Apr. 1, 1941

2,237,174

UNITED STATES PATENT OFFICE 2,237,174

FLOAT VALVE

Oscar F. Carlson, Kenilworth, Ill., assignor of one-half to Oscar F. Carlson Company, Chicago, Ill., a corporation of Illinois, and one-half to Everett N. McDonnell, Chicago, Ill.

Application July 8, 1940, Serial No. 344,330

8 Claims. (Cl. 137—104)

The present invention relates to float valves. The specific embodiment herein illustrated and described is a float valve suitable for use in supplying water to a shallow water evaporating pan, such as is employed for humidifying purposes.

Float valves are old. Float valves with snap action mechanism are also old.

The chief difficulty with snap action float valves of the prior art is that in order for the snap action to pass over center it requires the valve to move from its seat or the float to lose its holding power over the valve. This means that the valve tends to leak as the critical level is approached. Such leakage cuts the valve seat or valve face and tends to screen out and deposit impurities, with the result that a valve which has once begun such leakage cannot satisfactorily be closed off and may fail to function.

Valves of this type are also subject to not only the severe requirements of positive action without failure, but are required to operate within narrow margins—that is, a relatively slight shift in liquid level—and are subject to fouling with lime and other impurities from the evaporated water. The desideratum for this service is, therefore a valve which will operate positively within narrow limits of level change, will not fail to function due to fouling of the parts or such corrosion as is incidental to this use. The valve should be quiet and free from water hammer, and should not create any noise or disturbance in its operation.

The device of my present invention embodies the concept of a valve held to its seat by the spring loading of the snap action or detent, and wherein one of the elements of the snap action or detent mechanism is moved relative to the other by the travel of the float without requiring any movement of the valve or relaxation of the pressure of the valve upon its seat until the holding power of the snap action mechanism or detent is removed or reversed as the case may be.

Thereby the valve may be moved positively from shut to open position, and vice versa, without danger of leakage or failure to function.

In the preferred form of the invention, the valve closes against pressure, and hence the snap action or detent mechanism needs only to release its holding power and the pressure will open the valve. However, in the preferred form of the invention, the snap action mechanism is of the hill and roller type whereby, when the crest of the cam or hill is passed, the force of the spring loading reverses and positively throws the valve to open position.

In the preferred form of the valve herein disclosed, the valve itself is carried on a pivoted or swinging arm which is snapped to and fro by the reversals of spring loading of the snap mechanism. The arm is connected by suitable interconnections with the pivoted float arm to constitute a compound leverage. Thereby the power of the float acts through the compound leverage to add its closing or holding power to that of the snap mechanism. As a result, an unusually high holding power is secured with great simplicity. The compound leverage may also be employed through lost motion to open the valve when the float drops so as to add the power of the float to the snap mechanism in both the closing and opening operations. While the cam is described as having a crest with two lateral surfaces, one of which provides the closing and holding effect, and the other of which provides the opening effect, the latter instead of being an inclined surface, may be merely a flat surface and dependence put upon either the internal water pressure or the leverage, or both, to insure opening of the valve.

The valve of my invention provides certain additional advantageous features of design and construction, making for simplicity and positiveness in construction, operation and adjustment.

Since the valve is intended to operate in a relatively shallow pan within narrow limits of opening and closing, I have provided a construction which not only permits this operation, but permits of convenient adjustment of the float relative to the mechanism, and of the snap mechanism relative to the valve.

In the preferred form of my invention, the float arm is disposed so as to play above and below a mean horizontal position within a narrow operating angle. The float is preferably an elongated hollow body forming an extension of the arm and operating in conjunction with the mean horizontal level, the center of flotation, and hence the effective leverage shifts outwardly to give maximum closing power as the float moves downwardly below the mean level.

Similarly, when the valve is in closed position, the float extends at an angle above the horizontal, and its center of flotation moves towards the pivot so that as the level of the liquid drops the float has maximum power to start the operation of opening due to its weight and the shorter leverage of the flotation power.

Other novel features will be apparent from the following detailed description, drawings, and claims.

Now in order to acquaint those skilled in the art with the manner of constructing and operating one embodiment of my invention, I shall describe in connection with the accompanying drawings a specific embodiment and explain its mode of use and operation.

In the drawings:

Figure 1 is a longitudinal vertical section of one embodiment of my invention;

Figure 2 is a top plan view of the valve arm and cam shown in Figure 1;

Figure 3 is a bottom plan view of the float valve mechanism of Figure 1;

Figure 4 is a longitudinal vertical section, of a second embodiment of my invention; and Figure 5 is a bottom plan view of the float valve mechanism of Figure 4.

Referring first to the embodiment shown in Figures 1, 2 and 3, the float valve mechanism 10 is disposed in a pan 11 which is of shallow depth and may be of any suitable size. The main valve body 12 has a shoulder 12' and a threaded nipple 13 by which the valve body 12 and connected parts are mounted in the vertical wall of the pan. The threaded nipple 13 extends through a hole in the vertical wall of the pan at one end of the pan, and the body is clamped to this vertical wall by the shoulder 12' and the threaded nut 8 with intervening sealing gasket 9 to provide a liquid tight joint. The outer end of the nipple 13 is provided with an internal pipe thread for receiving the end of the supply pipe 7 through which water under city pressure is supplied to the hollow interior of the valve body 12. The valve body 12 is preferably made of a casting, and it is drilled or reamed to provide the central bore. A pair of integral ears 18, 18 at the top side of the valve body 12 provide a support for a pivot pin 19 upon which is pivotally mounted the valve carrying arm 16.

Likewise at the bottom of the body 12 a pair of projecting ears 23, 23 provide a support for the pivot pin 6 which carries the float arm 21. The ears 18, 18 and 23, 23 have their outer surfaces lying substantially in a common plane so that the same may be slabbed or ground off to provide finished surfaces. The valve body 12 has an outlet port provided through the tubular stainless steel seat member 14 which is a short section of tube pressed into a counterbore formed in the top wall of the body member 12. The valve seat member 14 communicates with an opening through the side wall of the body 12 so that liquid may be discharged through the hole or port in the seat member 14 when the same is uncovered.

The valve member or valve proper which cooperates with the ports in the seat member 14 to close and open the same is carried by the pivoted lever 16. This lever 16 is preferably formed of a sheet metal stamping having the two side arms 16a, 16a carrying at their outer free ends the pivot pin 27 for the spring-pressed pivoted detent member 26. At their rear ends the arms 16a are pivoted on the pivot pin 19. The two arms 16a, 16a are jointed by an integral web portion 16b which forms a roof or closure over the space within which the discharge of water from the valve ports is caused to occur. The top web 16b has a downwardly projecting skirt 16c lying between the arms 16a at the right hand end as viewed in Figures 1 and 2, and likewise a depending skirt 16d at the rear or left as shown in Figures 1 and 2, thereby to form with the side arms 16a an inverted box. The top wall or web 16b of the lever 16 is perforated to receive prongs projecting up from the edge of the sheet metal bracket member 17. These prongs are bent over or clinched to hold the box-like bracket member 17 rigidly on the arm 16. The valve face 15 is preferably formed of a semi-yielding material such as lead, and it is carried between the bottom of the bracket 17 and a retainer ring 17a which is held in place to the body of the bracket 17 by integral ears 17b projecting through the side walls of the said bracket member 17. Thus the lead valve face 15 is confined and firmly joined through the bracket 17 to the arm 16.

The swinging or pivoted detent 26 is disposed preferably midway between the arms 16a of the lever 16, and it is held in this central position between two projecting portions 16e, 16e integral with and formed as ears on the adjacent arms 16a. The detent arm 26 has a projecting portion 26a which lies between the ears 16e, 16e and is thereby centered. A spring 30 which has a central loop extending over the detent arm 26 as indicated at 30a in Figure 1 has two coiled portions on each side, and the ends of the coiled portions are anchored against the ears 16e, 16e whereby the spring 30 urges the arm 26 in a clockwise direction as viewed in Figure 1.

The detent lever 26 has at its lower end a cam 28 comprising two inclined edges 28a and 28b which meet at a crest or point at an obtuse angle. This cam cooperates with a roller 29 carried on a pin 29a. This pin is supported on the float lever 21. The float lever 21 comprises the two side arms 21a, 21a joined by two integral web portions 21b and 21c. The lever with the integral web portions is stamped out of a piece of sheet metal. The web 21b has a slot 21d therethrough, and the detent arm 26 has its lower end projecting through this slot. In order to reduce the contact between the side of the slot and the side of the lever 26 to a minimum, rounded projections 21e on the side of the slot provide guidance for the arm 26 with minimum friction.

Ears 21f, 21f are bent up from the edge of the web 21b to hold the stainless steel roller 29 against sidewise displacement so that it will always ride on the cam faces 28a, 28b. The thickened web portion 21c connecting the lever arms 21a, 21a has an upwardly extending shackle portion 31 with a slot 32 therein. The valve body 12 has an integral projection or pin 33 projecting into the slot 32, and the shackle 31 thereby limits the travel of the float arm 21 about its pivot 6. The float 20 is provided with a bracket member of sheet metal having arms 20a, 20a at top and bottom soldered to the float body 20 and having a vertical slide 20b which, in effect, is V-shaped at each edge to cooperate with the V-shaped jaws 21g, 21g formed on the outer ends of the arms 21a, 21a. These jaws are adapted to engage the edges of the vertical slide portion 20b, 20b, being pressed thereagainst by the thumb screw 22 and nut 22a. Thus, by releasing the thumb screw 22, the float 20 may be slid up or down in the jaws 21g, 21g and then clamped in any suitable position. This adjustment permits the float to be set at a higher or lower position relative to the arm 21, the motion of adjustment is a motion of translation transverse to the arm 21.

The float is adapted to play on either side of a mean horizontal position under the influence of raising and lowering water level.

The parts thus far described provide the necessary operating members for opening and closing the float control valve. However, I have provided additional parts connecting the float lever 21 with the valve lever 16 for the purpose first of limiting the travel of the valve arm 16 relative to the float arm, and, second, for transmitting the thrust of the arm 21 due to the float 20 or to the cam 28 and roller 29 to the valve carrying arm 16.

The means which performs this function is as follows. The float lever 21 has projections 24, 24 on the arms 21a, 21a adjacent the pivot pin 6 thus forming in effect short lever arms. These projections 24, 24 bear against the ends of the arms 25a which are connected to the valve carrying lever 16. The arms 25a are the sides of a U-shaped member 25 which is pivoted on the pivot pin 19 which is also the pivot pin of the valve carrying arm 16. This U shaped member overlies the top of the valve arm 16 and is connected to the valve arm 16 through a cam 26 and slot 25b. By rotating the cam 26 which is an eccentrically mounted pin mounted in the upper wall 16b of the lever 16, the angular position of the arms 25a with respect to the position of the valve carrying lever 16 may be adjusted. By this adjustment the upper extreme position of arm 21 may be set. That is to say, when the valve is on seat the arm 16 has a definite position. Now by adjusting the cam 26 the arms 25a may be swung about the pivot 19 in the desired direction. Since the engagement of the short arm 24 with the arm 25a limits the upper position of the float arm 21 and since the float 20 may be adjusted relative to the float arm, it can be seen that the float may thus be caused to play on either side of a mean position, which mean position is a horizontal position of the float arm 21 for all water levels selected. While the float 29 is shown as a short cylinder with axis vertical, I find it preferable where possible to employ a long cylinder with the axis horizontal, as disclosed in Figure 4.

The operation of the device thus far described is as follows. Assuming that the pan is set approximately horizontal, and that city water is connected through pipe 7, the pan being empty the float 20 will drop down to the point where the roller 29 rides on the lower inclined cam surface 28b. The upward thrust of this inclined cam surface under the influence of the spring 30 forces the arm 16 upwardly lifting the valve 15 off of the valve seat 14. Likewise entering water pressure tends to drive the valve away from the seat. The lever 16 cannot swing counterclockwise any further than is permitted by the engagement of the arms 25a with the short arms 24 of the float lever 21. Preferably, the shackle 31 prevents the float 20 from dropping against the bottom of the pan.

As the water level rises the float gains buoyancy, and then gradually carries the arm 21 upwardly, carrying the roller 29 past the crest of the cam 28. It will be observed that the lever 16 is swung in clockwise direction by the rotation of the lever 21 in counterclockwise direction of rotation through the interengagement of the arms 24 and 25a. Thus by the combined action of rising of the roller 29 through the counterclockwise direction of angular motion of the lever 21 and the downward travel of the detent arm 26 to the clockwise rotation of the lever 16, the cam and the roller are moved relative to each other past the crest of the cam and the inclined surface 28a engaging the roller 29, snaps the valve 15 against its seat 14.

The adjustment of the parts is such that the spring urged cam and roller resist closing movement, causing the float to ride lower in the liquid to develop its flotation power, but as soon as the roller passes the crest of the cam the direction of pressure of the spring 30 is reversed and it tends to lift the float at the same time that the valve is snapped to its seat. The valve carrying lever 16 may move downward faster than the float and its float arm can move upwardly because of the relative inertia of the parts. This is permitted because of the lost motion possible between the arms 25a and the arms 24.

The mean position of the float arm 21 is horizontal, and on the closed position of the valve the float arm 21 is thrown slightly above horizontal, whereas when the valve is open it is thrown below horizontal. The upper angular position of the float arm 21 is controlled by the adjustment of the cam 26 which regulates the angularity between the lever 16 and the arms 25a. The float, it will be observed, applies its flotation power through the lever and through the arms 24, 25a to force the valve carrying lever to apply the valve 15 against the seat 14. In commercial forms of valves which I have constructed, the cam and follower mechanism operating through the levers 21, 24, 25a and 16 will hold the valve against its seat for internal pressure of 150 pounds without any assistance from the float. With the flotation power of the float added to this, it will be seen that the valve closing and holding operation is unusually powerful. The float 20 is adjustable vertically in the sliding of the bracket 20b up or down in the jaws 21g. Since the mean position of the float lever 21 is horizontal, raising and lowering the float with respect to the arm may be made without any substantial disturbance of the operating characteristics of the mechanism. Where a float of substantial length longitudinally of the arm is employed, this is particularly important.

The box-like hood within which the valve 15 is carried prevents spraying of the liquid out of the pan when the valve is open.

The linkage herein shown is unique, in that motion between the cam and follower, as by rising or falling of the float 20, does not require movement of the valve with respect to its seat until the critical point is reached where the roller passes the crest of the cam. The roller is made of small diameter to make the neutral or crest position as sharp as possible consistent with satisfactory operation. The cam is preferably made of a non-corroding material, such as phosphor bronze, to cooperate with the stainless steel roller so that corrosion is substantially avoided. Assuming, for example, that the water level slowly allows the float to drop from the position shown in Figure 1, the lever 21 may move downwardly, thereby losing contact between the arms 25a of the lever 16 and the arm 24 of the lever 21, but the valve is still held to its seat by the inclined surface 28a of the cam acting on the roller. This causes the float to ride upwardly somewhat, and holds the valve 15 shut. As soon, however, as this travel has proceeded where the roller passes the crest of the cam or comes to the crest of the cam, the float 20, losing the retarding force tends to drop causing the roller rapidly to pass over the crest of the cam, and then the reverse inclined cam surface 28b forces the two levers 16 and 21 apart. Not only does the flotation power of the float 20, which has been recited, carry the roller past the crest of the cam, but the internal pressure of liquid acting on the valve 15 likewise tends to raise the valve 15 so that there never is any time when the roller can stop on the crest.

However, it is to be observed that so long as the cam has the holding power on the roller 20 through the cam surface 28a, the downward drag of the float 20 operates through the swinging cam lever 26 as a tension member to pull the outer end of the lever 16 downwardly, thereby assisting in holding the valve 14 to its seat.

In Figures 4 and 5 I have shown a modification of the valve in which the position of the cam and roller on the levers 16 and 21 is reversed. By this reversal of parts the cam surfaces and the roller are preferably brought above the water level in the tank. The specific form of the valve shown in the embodiment of Figure 4 comprises a bell-shaped holder 17 in the bottom of which is disposed the left face engaging the seat 14. The flaring annular space between the nipple which forms the seat of the valve acts not only to direct the water downwardly but also provides a throttling effect as the valve face approaches the seat. In this embodiment the float lever 21 is provided with the two projecting arms 24 and 24a lying on opposite sides of the cooperating arm 25a of the U-shaped lever 25. The arms 25a have lost motion or play between the arms 24 and 24a to permit operation without binding. The arm 24a insures that the lever 16 will be raised when the float 20' drops. Adjustment of the U-shaped arm forming an extension of the valve carrying lever 16 by the cam 26 is provided in this form for the same purpose and in the same manner as in the previous embodiment.

The float 20' is a cylindrical elongated body. Since the mean position of the float arm 21 is horizontal, and the play is on either side of the horizontal, it can be seen that when the valve is in the closed position as shown in Figure 4, the heel of the float, that is the left hand end as viewed in Figure 4, is submerged more deeply than the toe because of the angularity. When the valve is opened and the float has swung down the outer or toe end of the float is more deeply submerged, and hence the effective of the center of flotation is greater for the closing movement to start the cam over the roller. Thus the float at each extreme position is conditioned to be most effective to start the return movement.

The float is adjustable transversely of the float arm 21 by the side 20b guided between the jaws 21g, 21g. The slide member 20b has lugs 49, 49 struck out of the body of the same, these lugs overlying the clamping bolt 22 so that the float may not accidentally slip out of the jaws 21g, 21g. The effective range of adjustment is therefore between these lugs or ears 20c, 20c.

By the combination herein disclosed a very effective snap action for a lever control is provided. This is particularly applicable to float control valves but need not be confined to that particular application.

I do not intend to be limited to the details as shown and described except as they are decided as essential parts of the following claims, since it will be apparent to those skilled in the art that numerous changes and modifications may be made without departing from the scope of the invention as defined in the following claims.

I claim:

1. A float valve comprising, in combination, a valve body, a float, a bell crank lever having the float associated with one arm, an inlet port in said valve body, a second bell crank lever, a valve member for closing said inlet port carried by one arm of said second lever, an arm of the float lever engaging the other arm of said second lever and rotating the same in valve closing direction, a cam arm carrying a cam member and a follower member adapted to engage said cam member carried by the respective bell crank levers, and spring means biasing said cam arm against said follower member.

2. A mechanical movement for snap operation of an actuatable device comprising a first bell crank lever having a fixed pivot and having a long actuating arm and a short arm, a second bell crank lever having a fixed pivot parallel to the first pivot and having a long arm substantially parallel to the long arm of the first lever and a short arm adapted to be actuated by the short arm of the first lever, the long arm of the second lever being connected to an actuatable device, and spring actuated hill cam and follower snap action linkage between the long arms.

3. In combination, a first lever movable on a fixed pivot having a long actuating arm and a short arm, a second lever movable on a pivot parallel to the first pivot and having a long arm lying adjacent the long arm of the first lever and a short arm connected to the short arm of the first lever, whereby motion of the long actuating arm in one direction of rotation produces a motion of the other lever in the opposite direction of rotation, a device to be actuated, said device having a stationary member and a cooperating movable member, the movable member being actuated by motion of the long arm of the second lever, and a spring biased hill cam and follower snap action linkage connected between said long arms.

4. A device of the class described, comprising a valve body having a valve port, a bell crank lever pivoted on said body having a substantially horizontal arm and a substantially vertical arm, a valve for cooperation with said port carried by the horizontal arm, and a substantially horizontal float lever pivoted on said body and bearing at its outer end a float, said float lever having a coupling adjacent its pivot with the vertical arm of the bell crank lever whereby upward movement of said float causes downward movement of said bell crank lever biasing said valve against said port.

5. The combination of claim 4 with means for adjusting the angularity of the arms of the bell crank lever relative to each other, and a slidable adjustment for adjusting the level of the float with respect to the level of the float lever by a motion of translation of the float relative to the lever.

6. In combination a valve body having an upwardly facing valve seat, a valve carrying lever comprising a pair of spaced arms pivoted on the body and adapted to be disposed substantially horizontally, a horizontal web between the upper edges of said arms and depending skirt portions lying between the arms to define a downwardly opening hood, and a valve member carried by said web within the hood.

7. In combination, for use with a shallow pan for fluid, a horizontally extending valve body having an upwardly facing port, a lift valve cooperating with said port, a float lever pivoted on the lower side of the valve body having a substantially horizontal arm carrying a float, a valve lever pivoted on the upper side of the valve body and having a substantially horizontal arm carrying said valve overlying the aforesaid arm of the float carrying arm, a spring actuated cam and follower actuating mechanism for snapping the said arms toward and away from each other, one of said arms bearing the cam and the other of said arms carrying the follower, and a positive actuating connection between said levers independent of said spring actuated cam and follower actuating mechanism for positively forcing the valve against its seat by rise of the float, said valve body having a horizontal stud portion adapted to extend through a wall of said pan above the liquid level therein.

8. In combination, a valve body having a discharge port for liquid, a valve for closing and opening said port, a bell crank float lever pivoted on the body, said lever having a horizontally extending float arm, a float on said arm, a bell crank valve lever pivoted on said body, said valve lever having a horizontally extending valve arm for actuating said valve, a detent member mounted on one of said horizontal arms, a cam member carried on the other of said horizontal arms and having a vertically extending cam arm bearing a hill shaped cam for cooperating with said follower, and a positive motion transmitting linkage between said horizontal levers whereby rise of the float positively closes the valve over said port, said linkage comprising vertically extending arms of said bell crank levers.

OSCAR F. CARLSON.